June 26, 1956  A. GORDON  2,752,187
EYE BOLT LATCHING ASSEMBLY AND METHOD OF ASSEMBLING
Filed April 16, 1953
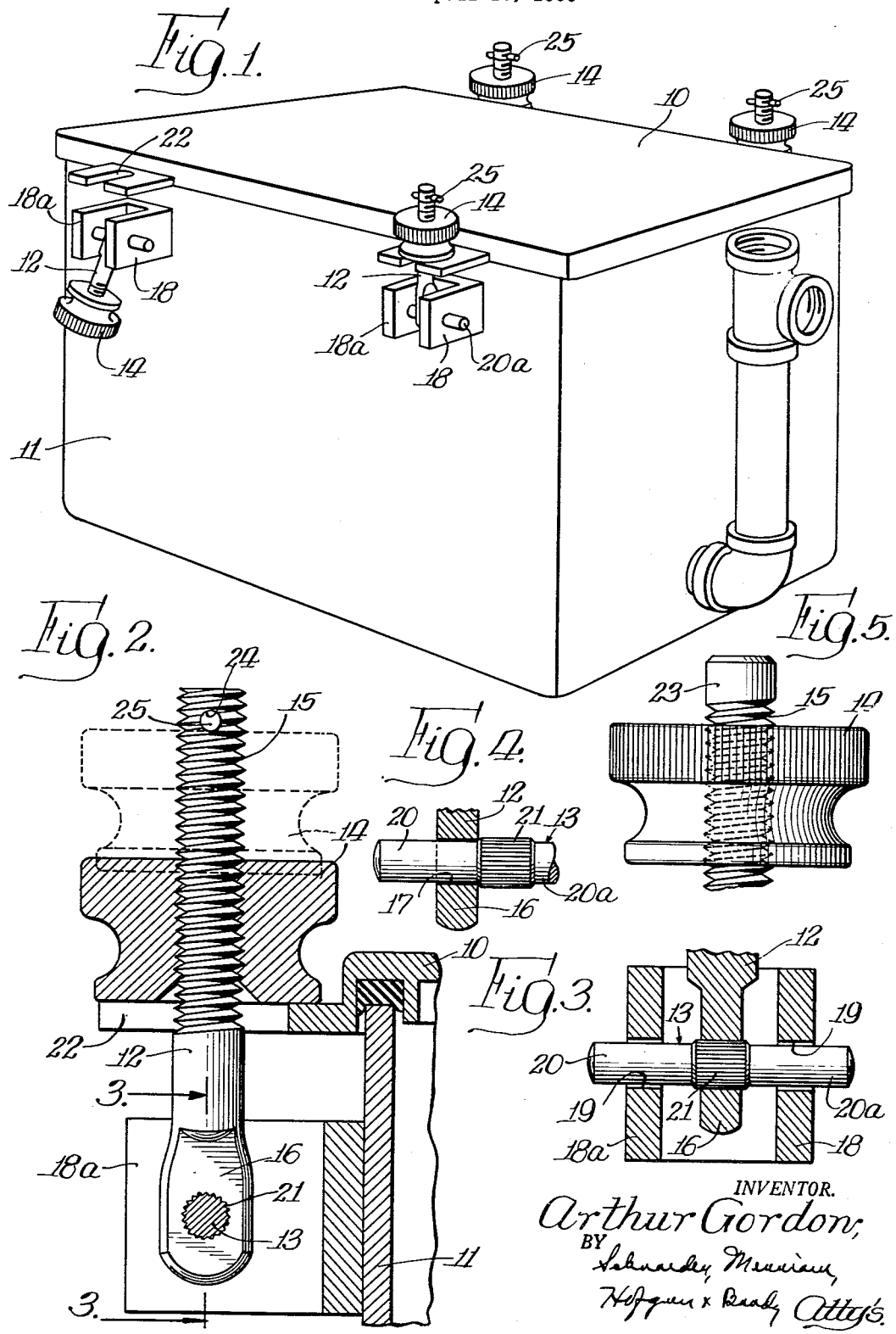
INVENTOR.
Arthur Gordon United States Patent Office 2,752,187
Patented June 26, 1956

2,752,187

EYE BOLT LATCHING ASSEMBLY AND METHOD OF ASSEMBLING

Arthur Gordon, Chicago, Ill.

Application April 16, 1953, Serial No. 349,271

1 Claim. (Cl. 292—256.75)

This invention relates to an eye bolt assembly of the type which is generally used in securing covers upon tanks or other containers and to a method of assembling the same. The primary object of this invention is to provide an improved means of attaching an eye bolt to its trunnions to anchor the trunnions in fixed relation thereto.

Another object is to provide an eye bolt assembly which may be handled, shipped and stored while disassembled, and which may be quickly and easily assembled for use.

A further object of the invention is to provide an eye bolt assembly which may be manufactured in its entirety from rod stock so that its cost may be kept to a minimum.

Still another object is to provide an eye bolt assembly whose trunnions need no means on their ends for locking them in operative position.

Another object is to provide an attaching pin having a longitudinally serrated portion which will accommodate itself within certain limits to eye bolts of varying sizes.

A further object is to provide a simple and easy method of assembling an eye bolt latching assembly in its operative position.

The invention is illustrated in the preferred embodiment in the accompanying drawings, in which:

Fig. 1 is a perspective view showing eye bolt assemblies in operative position on a tank of the type with which they are normally used;

Fig. 2 is a longitudinal sectional view of an eye bolt assembly;

Fig. 3 is a sectional view taken along line 3—3 of Fig. 2;

Fig. 4 is a fragmentary elevational view of an eye bolt assembly showing the serrated portion of the attaching pin about to be forced into the eye bolt; and Fig. 5 is a fragmentary elevational view of an upper portion of an eye bolt latching assembly showing a means for retaining a nut upon the threads of the assembly.

While the invention is susceptible of various modifications and alternative constructions, it is herein shown and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claim.

As shown in the drawings for the purpose of disclosure, the latching assembly is employed to secure a cover 10 in position on a container 11. Conventionally a plurality of latching assemblies are strategically distributed about the periphery of the cover with each assembly pivotally mounted on the container so as to be swingable into or out of engagement with the cover or a part fixed thereon, with the latching assembly including means capable of being tightened down to secure the cover when the assembly is in latching or operative position.

Because of its simplicity and resultant economy in manufacture, the lacthing assembly herein takes the form of an eye bolt assembly comprising generally an eye bolt 12, an attaching pin 13 and a securing nut 14. The eye bolt is made from rod stock and over a major portion of its length is formed with threads 15 to receive threadedly thereon the securing nut 14 which herein is of the spool type so that it too may be turned down from rod stock. The unthreaded end 16 of the eye bolt 12 may be left round but is preferably flattened, as best seen in Figs. 2, 3 and 4, and within the flattened area is formed with an opening 17 which might take various configurations but again, for reasons of simplicity and economy, is circular.

Formed on the container 11 is a pair of ears or lugs 18 and 18a spaced apart a sufficient distance to permit the eye bolt to be positioned therebetween and for ample clearance and freedom for pivotal movement in a plane parallel with the ears. Formed in each ear is a circular aperture 19 constituting bearings for the attaching pin 13 of the eye bolt 12. To make the assembly of the latching means a simple operation, the attaching pin has ends or trunnion portions 20 and 20a of a diameter less than the diameter of the openings 19 in the ears, and also of a diameter very slightly less than the diameter of the opening 17 in the eye bolt.

Intermediate its ends the attaching pin has a land 21 of a diameter just slightly larger than the opening 17 in the eye bolt but smaller than the openings 19 in the ears, so that this pin, and particularly this land, may pass therethrough. The land is made up of a series of serrations which run longitudinally of the attaching pin. When the land is forced into the eye bolt opening, each serration carves out its own particular groove within the wall of the eye bolt. The tooth-like engagement between the serrations of the land and the inner wall of the eye bolt, as can best be seen in Fig. 2, prevents the attaching pin 13 from turning with relation to the eye bolt 12. The friction provided by the close, gear-like engagement of the pin and the eye bolt secures the pin against lateral movement therein. Normally the attaching pin is composed of a metal slightly harder than that of the eye bolt to facilitate the cutting action of the serrations upon the inner wall of the eye bolt opening.

The method of assembling this latching assembly is extremely simple, yet it provides an effective and lasting locking means. The unthreaded end 16 of the eye bolt 12 is first placed between the ears on the container 11, and the opening 17 in the eye bolt is aligned with the two openings in the ears. An end 20 of the attaching pin is then inserted through one of the ears 18 and the eye bolt until the land strikes the flattened portion of the eye bolt, as shown in Fig. 4. End 20 should be of sufficient length to extend through the eye bolt so that it may rest in the bearing in the opposite ear 18a. The unthreaded end 16 of the eye bolt is next positioned adjacent the ear 18a to provide the eye bolt with a firm foundation as the land is forced into the opening in the eye bolt by tapping the end 20a of the attaching pin with a hammer or similar tool. The end 16 is preferably flattened so that the eye bolt will have no tendency to turn as the pin is being struck by the hammer. It should be noted in this latching assembly that the eye bolt and its trunnions operate as a unit, and yet it can be assembled without removing or altering the supporting ears in any way.

The spacing between the ears 18 and 18a on the container 11 and the length of the attaching pin 13 must be carefully considered. Regulation of this distance and of the length of the pin eliminates any necessity for a nut or other means on the ends of the pin to lock them in their bearings. However, it can readily be seen that if the eye bolt is permitted too much lateral movement within the ears, an end of the attaching pin might slip out of its bearing aperture. Thus, an arrangement as seen in Fig. 3 is an acceptable one, whereby some lateral movement is permitted, but there is no danger of the ends of the pin becoming disengaged.

As has been previously stated, a securing nut 14 is employed upon the threaded end of the eye bolt. During the latching operation the nut 14 is positioned on the threads 15 to allow the eye bolt to enter the slot 22 on the cover 10, and then it is screwed down upon the cover to secure the cover to the container 11. To unlock the assembly the securing nut 14 is merely unscrewed a sufficient distance to allow the eye bolt 12 to be swung clear of the slot 22 and into the position shown by the eye bolt on the left in Fig. 1.

Means are provided to retain the securing nut upon the eye bolt. Two convenient ways are shown in the drawings. In Fig. 5 the upper threads of the eye bolt are removed, as at 23, and in Fig. 2 a hole 24 is drilled into the threaded end of the eye bolt to receive a cotter pin 25, shown in Fig. 1, which prevents the nut from being removed from the threads.

Thus it can be seen that the present construction offers a latching assembly which is simple and inexpensive to manufacture, and convenient to handle and ship. Its principal parts can be made from rod stock and may be kept disassembled until actually put to use. Its assembly is an easy matter, and when assembled, it provides a strong and durable latch.

I claim:

In a container having a body and a cover, means for securing the cover to the body comprising; a pair of spaced ears on the body, each ear having a circular aperture and said apertures being aligned axially parallel to the cover; a lug on the cover having an outwardly opening slot in general longitudinal alignment with the space between the ears; a metallic eye bolt having an aperture at one end, the diameter of the aperture being smaller than the diameter of the ear apertures, a threaded opposite end having a diameter substantially less than the width of the lug slot, said eye bolt having a width axially of its aperture substantially less than the spacing between the body ears to permit shifting said eye bolt laterally between said ears to any one of a plurality of positions; a locking nut mounted on the threaded end and having an outside diameter substantially larger than the lug slot width; and a generally cylindrical pin having ends pivotally mounted in the ear apertures, and a longitudinally serrated midportion having a diameter less than the diameter of the ear apertures, said mid-portion being formed of a material harder than the eye bolt and adapted to penetrate the inner wall of the eye bolt aperture to secure fixedly the pin to the eye bolt while allowing pivotal motion of the eye bolt relative to the ears, whereby the threaded end of the eye bolt may be moved transversely into the lug slot and the locking nut advanced thereon to abut the cover lug and urge it toward said ears.

References Cited in the file of this patent

UNITED STATES PATENTS

| | | |
|---|---|---|
| 1,157,666 | Bennett | Oct. 26, 1915 |
| 1,546,192 | Berg | July 14, 1925 |
| 2,171,021 | Atwood | Aug. 29, 1939 |
| 2,277,874 | Miller | Mar. 31, 1942 |